UNITED STATES PATENT OFFICE.

ALEXIS SYSSOYEFF AND LOUIS BRALY, OF LYONS, FRANCE.

AUTOLUMINOUS COMPOSITION.

SPECIFICATION forming part of Letters Patent No. 606,693, dated July 5, 1898.

Application filed December 14, 1897. Serial No. 661,851. (No specimens.) Patented in France October 23, 1897, No. 271,593.

*To all whom it may concern:*

Be it known that we, ALEXIS SYSSOYEFF, a subject of the Czar of Russia, and LOUIS BRALY, a citizen of the Republic of France, residing at Lyons, France, have invented certain new and useful Improvements in Autoluminous Compositions for Incandescing Mantles and in the Methods of Producing such Mantles, (for which we have obtained French Letters Patent No. 271,593, dated October 23, 1897,) of which the following is a specification.

Our invention relates to what we term an "autoluminous composition" for becoming incandescent when brought into contact with a combustible gas, in the presence of air, without outside lighting appliances or mechanism, and such a composition as is applicable to mantles adapted to become incandescent in contact with a gas and the presence of air, and the incandescence of such composition adapted to be continued without interruption or feebleness so long as the same remains in the presence of a gas which is readily combustible and adapted to induce and maintain such incandescence of the composition alone or in applied condition to a mantle or other somewhat similar body for commercial application for lighting purposes.

The principal objects of our invention are, first, to provide a reliable or effective and highly meritorious autoluminous compounded composition for application to mantles or other suitable bodies adapted to become spontaneously or quickly incandescent in contact with a combustible gas, in the presence of air, without any outside lighting appliances or mechanism, and, second, to provide an economical and reliable method of producing the autoluminous composition and of its application to suitable bodies or mantles for the commercial or practical application of the said composition to lighting purposes.

Our invention, stated in general terms, consists of the autoluminous composition and of the method of producing the same and of its application to a suitable body or mantle, substantially as hereinafter described and claimed.

The nature, scope, and general characteristic features of our invention will be more fully understood from the following description, in which the compounding of the autoluminous composition is set out and the method of producing the same and of its application to a body or mantle is fully explained, in order to enable others skilled in the general art to which our present invention appertains to understand the same, and also to be enabled to practice the said invention for making a suitable body or mantle coated with the said composition for lighting purposes.

The composition of our invention results from the combination, in suitable proportions to be hereinafter set forth, of the oxids of the rare metals—such as thorium, cerium, or the like—with the metals obtained by reduction of the soluble salts of the platinum group. In order to obtain the aforesaid composition, we prepare two solutions, the first any luminous solution, to which we add in suitable proportions a solution of the soluble salts of iridium and vanadium.

As an example we indicate the following: soluble salts of thorium, one hundred parts; soluble salts of cerium, one part; soluble salts of iridium, 0.2 parts; soluble salts of vanadium, 0.002 parts.

The second solution is formed in suitable proportions of the following bodies freed from elements foreign to their group or family—that is, the soluble salts of rhodium and ruthenium, to which are added the soluble salts of cerium and vanadium.

As an example we may indicate the following: soluble salts of rhodium, fifty parts; soluble salts of ruthenium, fifty parts; soluble salts of cerium, two parts; soluble salts of vanadium, one part.

We then take a fabric such as usually employed for making incandescent mantles or other suitable porous body and dip the same into the first solution. After drying we give it a shape suitable to the use to which it is to be put, and then by means of a brush or other means we coat with the second solution, preferably reduced to a syrup-like consistency. We then destroy by any one of the known methods by burning out the organic material serving as a support to the composition and place then in a heater, in which it is first submitted to the action of the vapors of ethyl alcohol and then to a current of pure hydrogen until there is complete reduction of the reducible metals employed therein. Any other method of reduction may be employed if found more efficient for our purposes. An autoluminous composition is thus obtained which has the property of becoming automatically and spontaneously incandescent by contact with any combustible gas in presence of air, and which may also be utilized for automatically lighting the gas. This composition may be differently applied to all methods and systems for the combustion of gases, whatever may be the burners used, whether for the production of incandescence or for lighting or heating. The mantle or burner coated with the composition of our invention may be of any suitable shape and be carried or supported in any suitable manner, and so long as placed in contact with a readily-combustible gas, in the presence of air, most excellent results will be obtained.

Having thus described the nature and objects of our invention, what we claim as new, and desire to secure by Letters Patent, is—

1. An incandescing mantle or porous body subjected to a composition consisting of thorium, cerium, iridium and vanadium, dried and coated with a composition consisting of rhodium, ruthenium, cerium and vanadium, substantially as and for the purposes described.

2. An autoluminous composition formed of a mixture, in suitable proportions, of the soluble salts of rhodium and ruthenium freed from elements foreign to their group or family and the soluble salts of cerium and vanadium, in suitable proportions, substantially as and for the purposes described.

3. The process of making an incandescing mantle or other body, which consists in immersing the tissues or fabric employed in the manufacture of such a mantle or body in a solution of thorium, cerium, iridium and vanadium, in suitable proportions, then allowing the mantle or body to dry and giving shape thereto, then coating with another solution, consisting of rhodium, ruthenium, cerium and vanadium, in suitable proportions, then destroying any organic matter by any known means, then submitting in a heater to the vapors of ethyl alcohol and then to a current of pure hydrogen until complete reduction is effected of the reducible metals of the same, substantially as and for the purposes described.

In testimony whereof we affix our signatures in presence of two witnesses.

ALEXIS SYSSOYEFF.
LOUIS BRALY.

Witnesses:
THOS. N. BROWNE,
MARIUS VACHON.